US011231949B2

(12) United States Patent
Calciu et al.

(10) Patent No.: US 11,231,949 B2
(45) Date of Patent: Jan. 25, 2022

(54) USING CACHE COHERENT FPGAS TO ACCELERATE POST-COPY MIGRATION

(71) Applicant: VMware, Inc., Palo Alto, CA (US)

(72) Inventors: Irina Calciu, Palo Alto, CA (US); Jayneel Gandhi, Sunnyvale, CA (US); Aasheesh Kolli, Palo Alto, CA (US); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 250 days.

(21) Appl. No.: 16/048,183

(22) Filed: Jul. 27, 2018

(65) Prior Publication Data

US 2020/0034176 A1 Jan. 30, 2020

(51) Int. Cl.
*G06F 9/455* (2018.01)
*G06F 12/0862* (2016.01)
*G06F 12/0815* (2016.01)
*G06F 15/173* (2006.01)

(52) U.S. Cl.
CPC ...... *G06F 9/45558* (2013.01); *G06F 12/0815* (2013.01); *G06F 12/0862* (2013.01); *G06F 15/17331* (2013.01); *G06F 2009/4557* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS 5,764,934 A 6/1998 Fisch et al.
6,275,907 B1 8/2001 Baumgartner et al.
7,415,575 B1* 8/2008 Tong ............... G06F 12/126
711/129
8,413,145 B2 4/2013 Chou et al.
9,058,272 B1 6/2015 O'Bleness et al.
9,355,035 B2 5/2016 Goodman et al.
(Continued)

FOREIGN PATENT DOCUMENTS

KR 20180092273 A 8/2018

OTHER PUBLICATIONS

Yang, Hsin-jung et al., LEAP Shared Memories: Automating the Construction of FPGA Coherent Memories, 2014, IEEE, pp. 117-124.

*Primary Examiner* — Lewis A Bullock, Jr.
*Assistant Examiner* — Melissa A Headly
(74) *Attorney, Agent, or Firm* — Patterson + Sheridan, LLP (57) ABSTRACT

Disclosed are embodiments for migrating a virtual machine (VM) from a source host to a destination host while the virtual machine is running on the destination host. The system includes an RDMA facility connected between the source and destination hosts and a device coupled to a local memory, the local memory being responsible for memory pages of the VM instead of the source host. The device is configured to copy pages of the VM to the destination host and to maintain correct operation of the VM by monitoring coherence events, such as a cache miss, caused by the virtual machine running on the destination host. The device services these cache misses using the RDMA facility and copies the cache line satisfying the cache miss to the CPU running the VM. The device also tracks the cache misses to create an access pattern that it uses to predict future cache misses.

18 Claims, 8 Drawing Sheets

(56) References Cited

U.S. PATENT DOCUMENTS

| | | |
|---|---|---|
| 2005/0240745 A1 | 10/2005 | Iyer et al. |
| 2005/0273571 A1 | 12/2005 | Lyon et al. |
| 2006/0059317 A1 | 3/2006 | Kakeda |
| 2007/0180197 A1 | 8/2007 | Wright et al. |
| 2008/0086600 A1 | 4/2008 | Qiao |
| 2008/0127182 A1* | 5/2008 | Newport ............. G06F 12/1054 718/1 |
| 2008/0209127 A1* | 8/2008 | Brokenshire ....... G06F 12/0802 711/125 |
| 2009/0300289 A1 | 12/2009 | Kurts et al. |
| 2010/0274987 A1 | 10/2010 | Subrahmanyam et al. |
| 2010/0313201 A1 | 12/2010 | Warton et al. |
| 2011/0093646 A1 | 4/2011 | Koka et al. |
| 2011/0137861 A1 | 6/2011 | Burnett et al. |
| 2011/0252200 A1 | 10/2011 | Hendry et al. |
| 2014/0108854 A1 | 4/2014 | Antony et al. |
| 2014/0201460 A1 | 7/2014 | Blaner et al. |
| 2015/0052309 A1 | 2/2015 | Philip et al. |
| 2015/0095576 A1 | 4/2015 | Subrahmanyam et al. |
| 2015/0095585 A1 | 4/2015 | Subrahmanyam et al. |
| 2015/0212845 A1* | 7/2015 | Tsirkin ................ G06F 9/45558 711/114 |
| 2016/0253197 A1 | 9/2016 | Bonzini et al. |
| 2016/0321181 A1* | 11/2016 | Kaxiras ............... G06F 12/0831 |
| 2017/0031825 A1 | 2/2017 | Chen et al. |
| 2017/0192886 A1 | 7/2017 | Boehm et al. |
| 2018/0189087 A1 | 7/2018 | Palermo et al. |
| 2018/0239707 A1 | 8/2018 | Tsirkin |
| 2018/0373553 A1 | 12/2018 | Connor et al. |
| 2018/0373561 A1 | 12/2018 | Nassi et al. |
| 2019/0179750 A1 | 6/2019 | Moyer et al. |
| 2019/0207714 A1 | 7/2019 | Loewenstien et al. |
| 2019/0266101 A1 | 8/2019 | Robinson et al. |
| 2019/0278713 A1 | 9/2019 | Gandhi et al. |
| 2020/0034175 A1 | 1/2020 | Calciu et al. |
| 2020/0034200 A1 | 1/2020 | Calciu et al. |
| 2020/0034294 A1 | 1/2020 | Calciu et al. |
| 2020/0034297 A1 | 1/2020 | Calciu et al. |
| 2020/0125384 A1 | 4/2020 | Serebrin et al. |
| 2020/0285580 A1 | 9/2020 | Subramanian et al. |

\* cited by examiner

USING CACHE COHERENT FPGAS TO ACCELERATE POST-COPY MIGRATION

CROSS-REFERENCE TO RELATED APPLICATIONS

This application is related to:

U.S. application Ser. No.16/048,180, filed on Jul. 27, 2018, which application is incorporated by reference in its entirety into the present application, U.S. application Ser. No. 16/048,182, filed on Jul. 27, 2018, now U.S. Pat. No. 11,099,871, U.S. application Ser. No. 16/048,178, filed on Jul. 27, 2018, now U.S. Pat. No. 11,126,464, and U.S. application Ser. No. 16/048,186, filed on Jul. 27, 2018, now U.S. Pat. No. 10,761,984.

BACKGROUND

In live migration of a virtual machine from a source to a destination host, the migration requires that all of the memory pages of the virtual machine be transferred eventually from the source host to the destination host. In one embodiment, all of the memory pages are transferred before the virtual machine started on the destination host. In another embodiment, all of the pages are transferred after the virtual machine is started on the destination host, which is termed post-copy migration. However, while it is possible to start the virtual machine on the destination host before any pages are transferred, such a situation encounters many page faults at the destination host which must be serviced by a hypervisor or other fault-catching software to bring the needed pages into the memory of the destination host. This approach inefficient because the page faults are expensive to service and the time to obtain a page to satisfy the page fault can be excessive, especially if the page is large (2 MB to 1 GB). It is desirable to avoid both of these inefficiencies in the case of post-migration copying of pages.

SUMMARY

One embodiment is a method for migrating a virtual machine from a source host to a destination host. The method includes indicating to the destination host that pages of the virtual machine are all present on the destination host before the pages of the virtual machine are sent to the destination host so that page faults are avoided while the virtual machine is running on the destination host. The method further includes receiving notice of a cache miss, intervening upon the notice of a cache miss to handle the cache miss by obtaining a cache line satisfying the cache miss from the source host using an RDMA facility, copying the cache line into a local memory, and sending the cache line from the local memory to the destination host to satisfy the cache miss.

Further embodiments include a device configured to carry out one or more aspects of the above method and a computer system configured to carry out one or more aspects of the above method.

BRIEF DESCRIPTION OF THE DRAWINGS

FIB. 3C depicts a flow chart of an embodiment of the request handling module.

DETAILED DESCRIPTION

Figure 1:
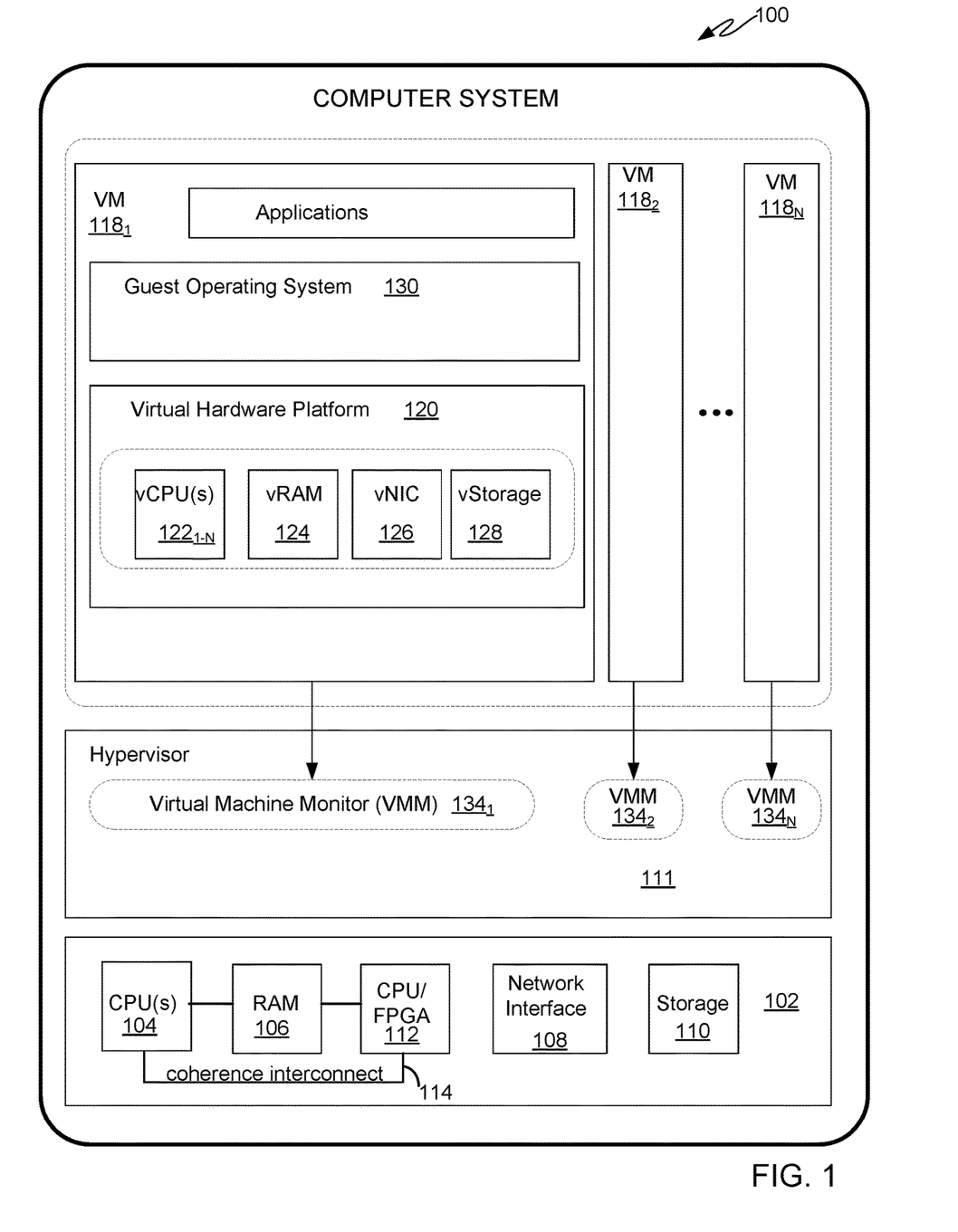
FIG. 1 depicts a block diagram of a computer system that is representative of a virtualized computer architecture in which embodiments may be implemented.

FIG. 1 depicts a block diagram of a computer system 100 that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more central processing units (CPUs) 104, a point-to-point coherence interconnect 114 between processors which supports a cache coherence protocol, such as the UltraPath Interconnect (UPI), random access memory (RAM) 106, one or more network interfaces 108, and persistent storage 110. In the embodiment illustrated herein, a field programmable gate array (FPGA) 112 is installed in one socket 202b of the CPU sockets and communicates with one or more CPUs 104 via coherence interconnect 114.

A virtualization software layer, referred to herein after as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, Calif. In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a physical computing machine platform that is executed under the control of hypervisor 111. Virtual devices of a VM 118 are embodied in the virtual hardware platform 120, which is comprised of, but not limited to, one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as the Microsoft Windows® operating system, the Linux® operating system, and the like.

It should be recognized that the various terms, layers, and categorizations used to describe the components in FIG. 1 may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 120 may be merged with and into VMM 134.

Figure 2:
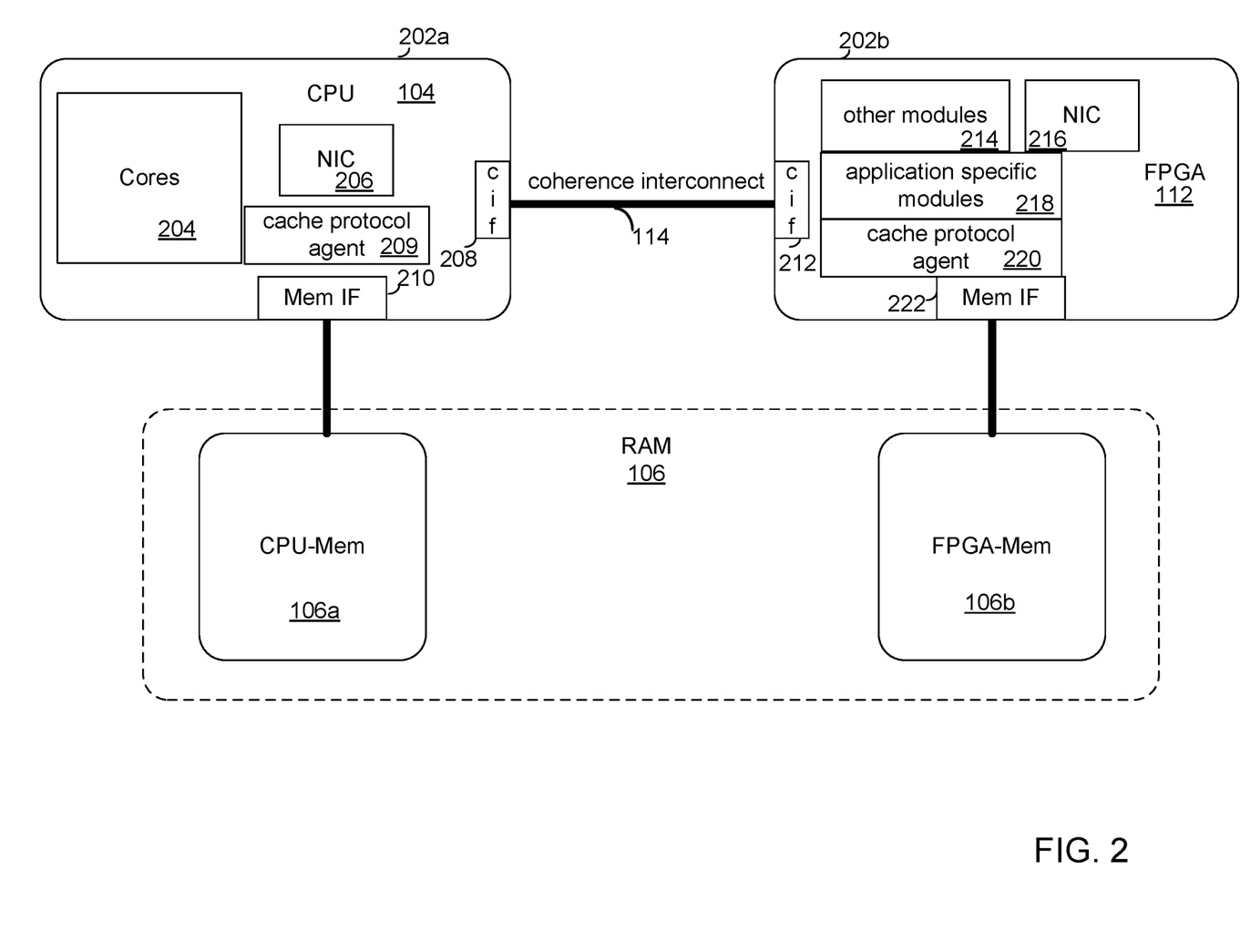
FIG. 2 depicts a block diagram of a pair of CPU sockets for CPUs in FIG. 1, in an embodiment.

FIG. 2 depicts a block diagram of a pair of CPU sockets, with a first socket 202a for CPU 104 and a second socket 202b for FPGA 112. CPU 104 includes one or more processing cores 204, an interface 210 to CPU memory (CPU-Mem) 106a accessible by CPU 104, a network interface controller (NIC) 216, a communications interface (cif) port 208 connected to coherence interconnect 114 and a cache protocol agent 209. FPGA 112 is configured with a network interface 216, one or more application-specific modules 218, a cif port 212 and a cache protocol agent 220. Application specific modules 218 are configured by a bitstream representing custom programming of FPGA 112. Other modules and functions 214 whose operations are unrelated to application-specific modules 218 may be present in FPGA 112, these modules and functions being configured by a bitstream different from the custom programming bitstream. FPGA 112 has an interface 222 to its own memory, FPGA memory 106b (FPGA-Mem), which is a restricted portion of RAM 106. In one embodiment, each CPU socket represents a separate Non-Uniform Memory Access (NUMA) domain. The application or the VM is running on the CPU, located on the first socket 202a, while the FPGA is on the second socket 202b.

In one embodiment, the CPU 104 has a cache (not shown in FIG. 2), which is used to reduce the average cost to access data from the memory. Data transferred between memory and cache in blocks of fixed size, called cache lines or cache blocks. When a cache line is copied from memory into the cache, a cache entry is created, which includes the copied data as well as the requested memory location (called a tag). When the CPU needs to read or write a location in the memory, it first checks for a corresponding entry in the cache. The cache checks for the contents of the requested memory location in any cache lines that might contain that address. If the processor finds that the memory location is in the cache, a cache hit has occurred; the CPU immediately reads or writes the data in the cache line. However, if the CPU does not find the memory location in the cache, a cache miss has occurred. For a cache miss, the cache allocates a new entry and copies data from main memory, then the request is fulfilled from the contents of the cache.

Cif ports 208, 212, mentioned above, support a coherence protocol, which is designed to maintain cache coherence in a system with many processors each having its own cache. With FPGA 112 residing in one socket 202b of the CPU sockets and having its own cif port 212, FPGA 112 can monitor and participate in the coherency protocol that keeps the processor caches coherent.

Cache coherence on coherence interconnect 114 is maintained according to a standard protocol, such as modified, exclusive, shared, invalid (MESI) protocol or modified, exclusive, shared, invalid, forwarded (MESIF) protocol. In these protocols, cache lines marked invalid signify that the cache line has invalid data and must be brought into the cache from memory accessible by the cache. Cache lines marked exclusive, shared and forwarded (in the MESIF protocol) all signify that the cache line has valid data, but the cache line is clean (not modified), so the cache line can be discarded without writing the cache line back the data to memory. A cache line marked as modified signifies one that holds a modified or dirty cache line, and must be written back to memory before the cache line is discarded from the cache.

To enforce the cache coherence protocol requires a cache protocol agent for each cache connected to a coherence interconnect. Each cache protocol agent can initiate and respond to transactions on the coherence interconnect by sending and receiving messages on the interconnect. In the present embodiments, CPU 104 has cache protocol agent 209 and FPGA 112 has cache protocol agent 220.

When a CPU accesses a cache line that is not in its cache, at any level of the cache hierarchy, cache protocol agent 209 of CPU 104 requests the cache line. Thus, cache protocol agent 209 in the CPU issues a load cache line transaction on coherence interconnect 114. This can be 'Load Shared' for sharing the cache line, or 'Load Exclusive' for cache lines that will be modified. A cache line that is loaded as 'Exclusive' is considered potentially dirty, because it is not certain the cache line will be modified. When the cache line gets evicted from the CPU hardware caches, if it is modified, it must be written back to the memory from which it originated. The operation of writing the cache line back is present on coherence interconnect 114 as a writeback transaction and can be monitored for tracking dirty cache lines. In the case of a writeback transaction, the cache line is actually dirty, rather than potentially dirty.

To confirm whether a cache line is dirty or not, a cache protocol agent, such as agent 220 in FPGA 112, can snoop the cache line in accordance with the coherence interconnect protocol. This causes a writeback transaction to be triggered, if the cache line is dirty Messages corresponding to cache coherence events involved in the various embodiments described below include 'Load_Data_CL' and 'WB_Data_CL'. The 'Load_Data_CL' message occurs when a cache line (CL) is loaded as exclusive into a processor cache. A 'WB_Data_CL' message occurs when a processor writes back a cache line into memory because the cache line is dirty and is being evicted from the cache. Additionally, a 'WB_Data_CL' message can occur when a processor executes a store instruction, which bypasses the caches in the cache hierarchy. Such a store instruction is recognized by cache protocol agent 220 of FPGA 112. The messages are asynchronous messages to and from the appropriate independently operating modules and functions in the descriptions herein. More particularly, a step, 'Send(msg to dest)', is an asynchronous non-blocking transmission of a message, msg, to a destination, dest, and a step, 'Received(msg)', is a predicate, which if true is interpreted as signaling that a message, msg, has been received. If false, no message has been received, and the function or module is blocked waiting for a message to arrive. However, the function or module can configure the predicate so that by testing the predicate, the function or module can avoid being blocked. Embodiments described herein are not limited by any specific form or method of sending or receiving messages.

Figure 3A:
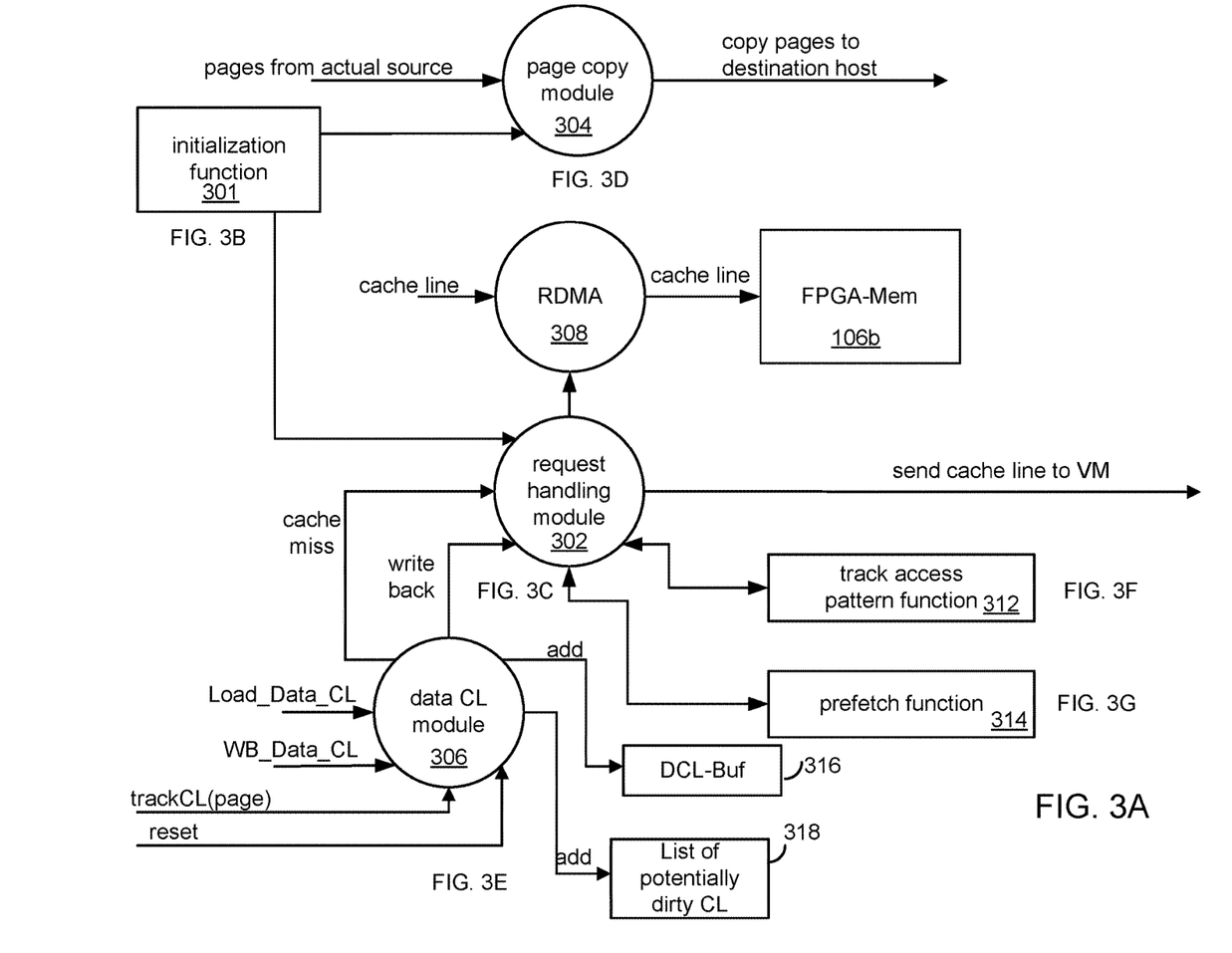
FIG. 3A is a graphical depiction of the components involved in the post-copy migration operation, in an embodiment.

FIG. 3A is a graphical depiction of the components involved in the post-copy migration operation. FIG. 3A includes a remote direct memory access (RDMA) facility 308, an initialization function 301 described in reference to FIG. 3B, a request handling module 302 described in reference to FIG. 3C, a page copy module 304 described in reference to FIG. 3D, a data CL module 306 described in reference to FIG. 3E, a dirty cache line buffer (DCL-Buf)

Figure 3B:
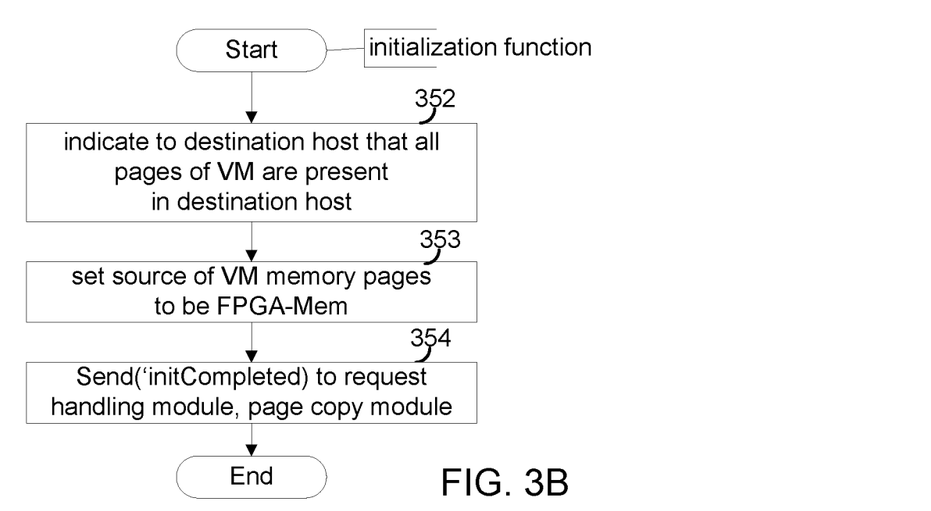
FIG. 3B depicts a flow chart of an initialize function, in an embodiment.
Figure 3C:
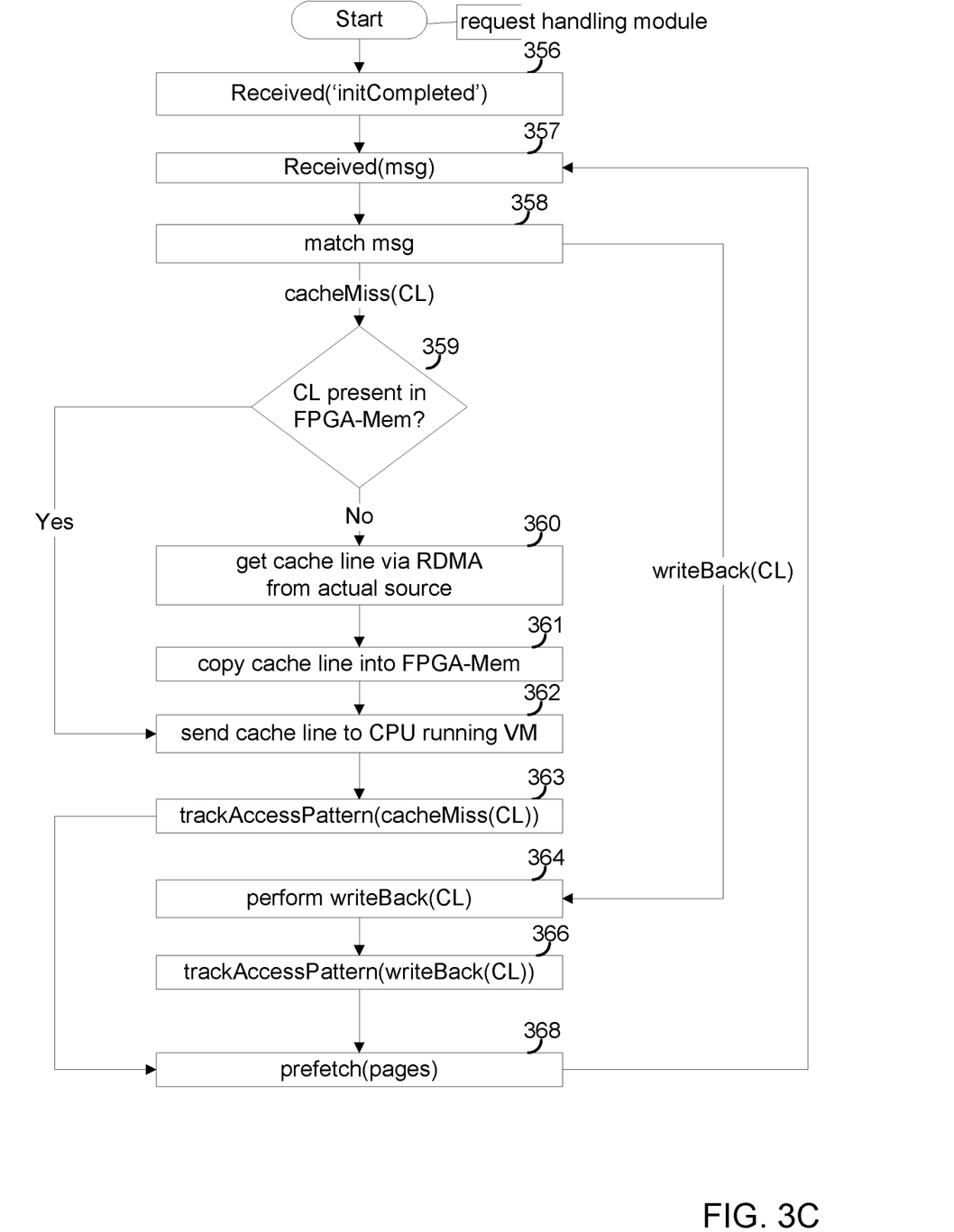
Figure 3D:
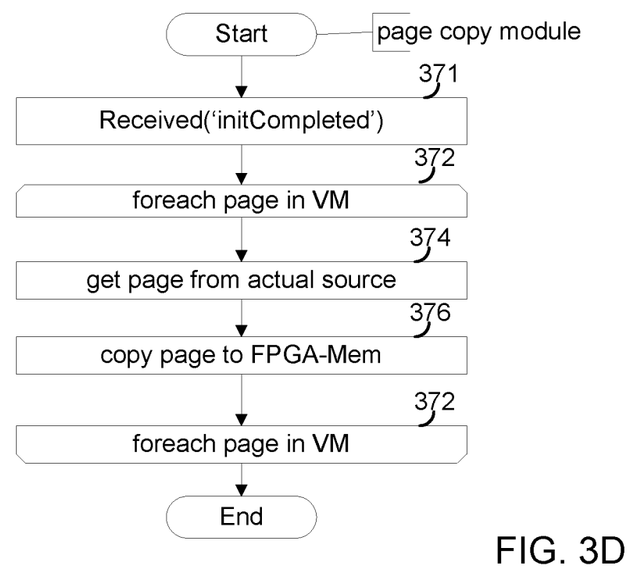
FIG. 3D depicts a flow chart of the page copy module, in an embodiment.
Figure 3E:
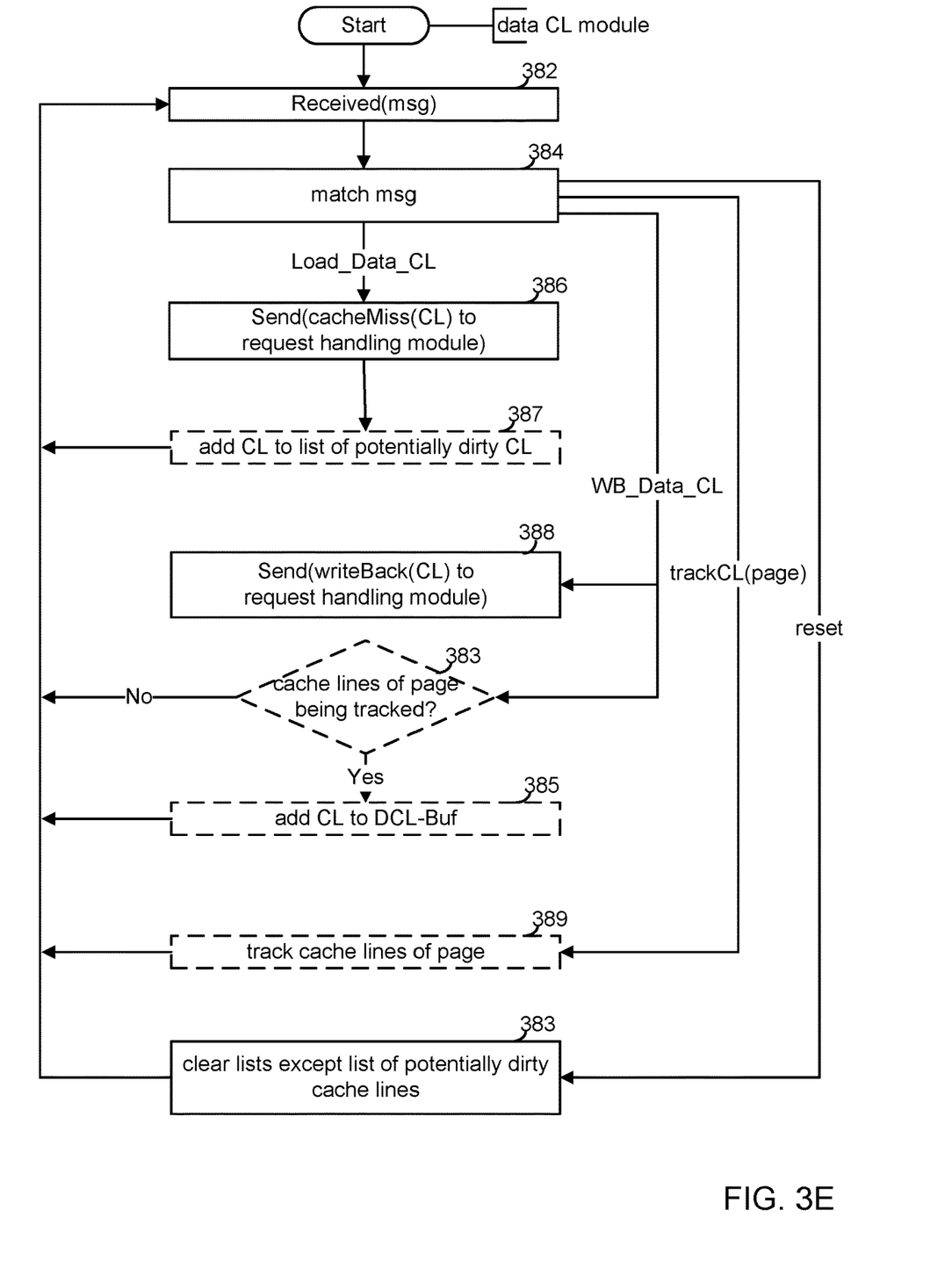
FIG. 3E depicts a flow chart of the data CL module, in an embodiment.
Figure 3F:
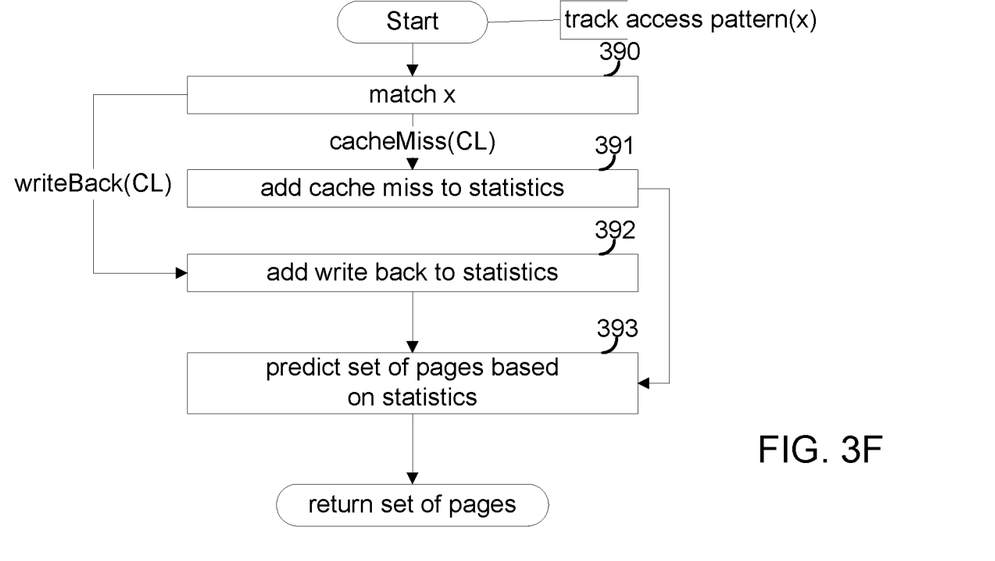
FIG. 3F depicts a flow chart of the track access pattern function, in an embodiment.
Figure 3G:
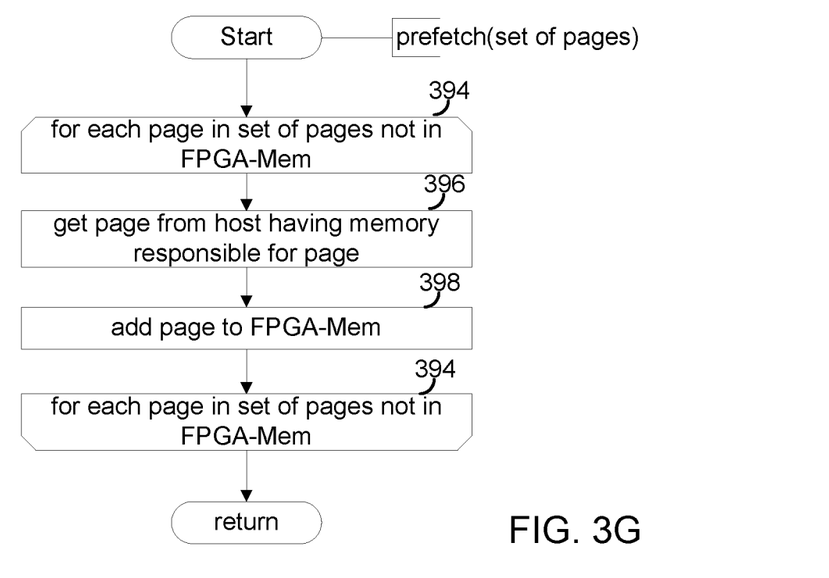
FIG. 3G depicts a flow chart of the prefetch function, in an embodiment.

316, a list 318 of potentially dirty cache lines, a track access pattern function 312 described in reference to FIG. 3F, a prefetch function 314 described in reference to FIG. 3G, and a memory (FPGA-Mem) 106b accessible by FPGA 112.

FIG. 3B depicts a flow chart of the initialize function. In step 352, function 301 indicates to the destination host of the virtual machine (VM) that all pages of the VM are present in the destination host by altering the pages tables of the VM in the destination host, even though the pages are not yet present in the destination host. This avoids the VM causing page faults in the destination host. In step 353, module 302 sets the source of the VM pages to be FPGA-Mem 106b by altering page tables used by RDMA and VM in the destination host even though the actual source is not FPGA-Mem 106b. Step 353 thus makes it appear that FPGA-Mem 106b is the source of the VM pages and that FPGA 112 in the destination host is the responsible agent for the memory containing those pages. This allows request handling module 302 to intervene on cache misses caused by the destination host accesses. In some embodiments, when the size of the VM is large, the size of the physical address space is presented as larger than the actual size of FPGA-Mem 106b. In step 354, function 301 sends an 'initComplete' message to request handling module 302 and page copy module 304. In one embodiment, hypervisor 111 performs steps 352 and 354.

FIG. 3C depicts a flow chart of an embodiment of the request handling module. This module handles cache misses caused by the execution of the VM on the destination host, where a cache miss refers to an access of a CPU cache specifying a cache line that is currently not present (i.e., missing) in that CPU cache. In step 356, module 302 receives an 'initCompleted' message from initialization function 301. In step 357, module 302 receives a message which it matches in step 358 to either a 'cacheMiss(CL)' message or a 'writeBack(CL)' message. In step 359, module 302 handles the 'cacheMiss(CL)' message by testing whether the cache line (CL) is present in FPGA-Mem 106b. If not, then module 302 gets the missing cache line using RDMA facility 308 from the source host. In step 361, module 302 copies the cache line into FPGA-Mem 106b, and in step 362 sends the cache line specified by the access and thus satisfying the cache miss to the CPU running the VM and the CPU's cache. In step 363, module 302 optionally calls track access pattern function 312, with the cache miss as an input. Alternatively, if the cache line is present in FPGA-Mem 106b, as determined in step 359, module 302, then in step 362, the module sends the cache line to the CPU running the VM. In step 363, module 302 handles a writeBack(CL) message by performing the write back of the cache line to FPGA-Mem 106b and optionally calls track access pattern function 312 with the write back as the input. In step 368, module 302 optionally calls prefetch pages function 314 based on the predictions from the track access pattern function 312, so as to avoid latency in satisfying cache misses. In an embodiment, module 302 is included application-specific modules 218 in FPGA 112, which performs steps 356 to 368.

FIG. 3D depicts a flow chart of the page copy module. After the 'initCompleted' message is received in step 317, module 304 copies pages of the VM from the source host to the destination host in the background, i.e., independently of other operations. In step 372, module 304 starts an iterator over the pages in the VM. In step 374, module 304 gets a page from the source host and in step 376 copies the page to FPGA-Mem 106b. In an embodiment, module 304 is included in application-specific modules 218 in FPGA 112, which performs steps 372 through 376, thus relieving hypervisor 111 from performing the copying of pages to the destination.

FIG. 3E depicts a flow chart of the data CL module. Module 306 detects coherence events on coherence interconnect 114. In step 382, module 306 receives a message and in step 384, matches the message to either a 'Load_Data_CL', a 'WB_Data_CL' message, a 'trackCL(page)' message or a 'reset' message. In step 386, module 306 handles the 'Load_Data_CL' message by sending a cacheMiss(CL) message to request handling module 302. In optional step 387, module 306 adds the cache line specified in the cache miss to list 318 of potentially dirty cache lines. In step 388, module 306 handles the 'WB_Data_CL' message by sending a 'writeBack(CL)' message to request handling module 302. In optional steps 383 and 385, module 306 handles a 'WB_Data_CL' message by determining in step 383 whether cache lines of a page are being tracked and if so, then, in step 385, adding a representation of the cache line to DCL-Buf 316. In optional step 389, module 306 handles the 'trackCL(page)' message by tracking cache lines of the page specified in the message. In step 383, module 306 handles the 'reset' message by clearing its internal lists, e.g., DCL-Buf 316, but not list 318 of potentially dirty cache lines. In an embodiment, module 306 is included in application-specific modules 218 in FPGA 112, which performs steps 382 through 389. Though data CL module 306 can monitor cache coherence events in the present context, data CL module 306 can monitor cache coherence events in other environments as well as it monitors coherence events on a coherence interconnect between physical processors.

FIG. 3F depicts a flow chart of the track access pattern function. In step 390, function 312 matches its input to either 'cacheMiss(CL)' or 'writeBack(CL)'. If function 312 is called with input 'cacheMiss(CL)', then in step 391 function 312 adds the cache miss to statistics that it maintains. If function 312 is called with input 'writeBack(CL)', then in step 392, function 312 adds the write back to the statistics. In step 393, function 312 predicts a set of pages to be prefetched based on the statistics. In an embodiment, function 312 is included in application-specific modules 218 in FPGA 112, which performs steps 390 and 393.

FIG. 3G depicts a flow chart of the prefetch function. In step 394, function 314 starts an iterator over the current set of pages predicted by track access pattern function 312 but not currently present in FPGA-Mem 106b. In step 396, function 314 obtains the page from the host having memory responsible for the page and in step 398, adds the page to FPGA-Mem 106b. In one embodiment, function 314 is included in application-specific modules 218 in FPGA 112, which performs steps 394-398.

Thus, the embodiments describe herein improve the efficiency of a post-copy live migration of a virtual machine by avoiding page faults at the destination host and quickly satisfying cache misses while pages of the virtual machine are being copied to the destination host.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for migrating a virtual machine from a source host to a destination host, comprising:
    altering page tables of the destination host to indicate to the destination host that all pages of the virtual machine are all present on the destination host before all of the pages of the virtual machine are transferred to the destination host and when the pages are not all present in a local memory of the destination host;
    while executing the virtual machine on a CPU in the destination host,
        receiving notice of a cache miss instead of a page fault caused by the CPU that executes the virtual machine on the destination host, the cache miss occurring when the CPU accesses a cache line contained in a page that the page tables of the destination host indicate is present in the local memory of the destination host even though the page containing the cache line is not present in the local memory of the destination host; and
    intervening upon the notice of the cache miss to handle the cache miss by:
        obtaining, by the destination host, the cache line satisfying the cache miss from the source host using a remote direct memory access (RDMA) facility;
        copying the cache line into the local memory; and
        sending the cache line to the CPU running the virtual machine to satisfy the cache miss.

2. The method of claim 1, further comprising indicating to the destination host that the local memory is a source of the pages of the virtual machine.

3. The method of claim 1, wherein intervening includes:
    monitoring cache coherence events; and
    providing the notice that a cache coherence event is the cache miss.

4. The method of claim 3, wherein a cache coherence event includes a load of the cache line.

5. The method of claim 1, further comprising, while the virtual machine is running on the destination host, performing a copy operation of pages of the virtual machine from the source host to the destination host.

6. The method of claim 1, further comprising:
    tracking an access pattern based on the cache miss; and
    predicting a set of pages for pre-fetching.

7. The method of claim 6, further comprising:
    pre-fetching the predicted set of pages from the source host; and
    copying the predicted set of pages into the local memory.

8. A device for migrating a virtual machine from a source host to a destination host, the device comprising:
    a request handling module configured to alter page tables of the destination host to indicate to the destination host that all pages of the virtual machine are all present on the destination host before all of the pages of the virtual machine are transferred to the destination host and when the pages are not all present in a local memory of the destination host; and a data CL module configured to monitor cache coherence events and provide notice of a cache miss;
the request handling module coupled to the local memory and further configured to:
  while executing the virtual machine on a CPU in the destination host,
    receive the notice of the cache miss instead of a page fault from the data CL module for data of a page not present in the local memory, the cache miss being caused by the CPU that executes the virtual machine on the destination host, the cache miss occurring when the CPU accesses a cache line contained in the page that the page tables of the destination host indicate is present in the local memory of the destination host even though the page containing the cache line is not present in the local memory of the destination host; and
    intervene upon the notice of the cache miss to handle the cache miss by:
      obtaining, by the destination host, the cache line satisfying the cache miss from the source host using a remote direct memory access (RDMA) facility;
      copying the cache line into the local memory; and
      sending the cache line to the CPU executing the virtual machine to satisfy the cache miss.

9. The device of claim 8, wherein the local memory is made to be a source of pages of the virtual machine.

10. The device of claim 9, wherein the device further includes a page copy module configured to perform a copy operation of pages of the virtual machine from the source host to the local memory while the virtual machine is running on the destination host.

11. The device of claim 8, wherein a cache coherence event includes a load of the cache line.

12. The device of claim 8, wherein the request handling module is further configured to:
  track an access pattern based on the cache miss; and
  predict a set of pages for pre-fetching based on the access pattern.

13. The device of claim 12, wherein the request handling module is further configured to:
  pre-fetch the predicted set of pages from the source host based on the access pattern; and
  copy the predicted set of pages into the local memory.

14. A system comprising:
a remote direct memory access (RDMA) facility connected from a source host to a destination host, the destination host running a virtual machine;
a CPU, of the destination host, residing in a first CPU socket;
a first memory coupled to the CPU, the CPU running a hypervisor and the virtual machine in the first memory;
a device residing in a second CPU socket of the destination host; and
a second memory, of the destination host, coupled to the device;
wherein the device is configured to:
  monitor cache coherence events; and
  while the CPU runs the virtual machine:
    alter page tables of the destination host to indicate to the destination host that all pages of the virtual machine are all present on the destination host before all the pages of the virtual machine are transferred to the destination host and when the pages are not all present in the second memory;
    provide notice of a cache miss and not a page fault to the device residing in the second CPU socket, the cache miss occurring when the CPU that runs the virtual machine accesses a cache line contained in a page that the page tables of the destination host indicate is present in the second memory even though the page containing the cache line is not present in the second memory; and
    intervene upon the notice of the cache miss to handle the cache miss by:
      obtaining, by the destination host, the cache line satisfying the cache miss from the source host using the RDMA facility;
      copying the cache line into the second memory; and
      sending the cache line to the CPU running the virtual machine to satisfy the cache miss.

15. The system of claim 14, wherein a cache coherence event includes a load of the cache line.

16. The system of claim 14, wherein the device is further configured to perform a copy operation of pages of the virtual machine from the source host to the second memory while the virtual machine is running on the destination host.

17. The system of claim 14, wherein device is further configured to:
  track an access pattern based on the cache miss; and
  predict a set of pages for pre-fetching based on the access pattern.

18. The system, of claim 17, the device further configured to perform a pre-fetch function configured to:
  pre-fetch the predicted set of pages from the source host; and
  copy the predicted set of pages into the second memory.

* * * * *